United States Patent
Garrabrant et al.

(10) Patent No.: US 6,952,571 B1
(45) Date of Patent: Oct. 4, 2005

(54) DIGITAL SIGNAL PROCESSOR UPDATE OF SINGLE CHANNEL STRENGTH SIGNAL

(75) Inventors: Gary Garrabrant, Seattle, WA (US); John Brown, Lynnwood, WA (US); Edward Vertatschtisch, Bellevue, WA (US); Katherine Elliott, Seattle, WA (US)

(73) Assignee: Palm, Inc., Sunnyvale, CA (US)

( * ) Notice: Subject to any disclaimer, the term of this patent is extended or adjusted under 35 U.S.C. 154(b) by 776 days.

(21) Appl. No.: 09/874,674

(22) Filed: Jun. 4, 2001

Related U.S. Application Data

(63) Continuation-in-part of application No. 09/847,768, filed on May 1, 2001, now Pat. No. 6,901,276.

(51) Int. Cl.$^7$ ............................................. H04B 17/00
(52) U.S. Cl. ................ 455/226; 455/343.1; 455/343.2; 455/343.3; 455/343.6; 455/226.2
(58) Field of Search ........................ 455/226.2, 343.1, 455/343.2, 343.6

(56) References Cited

U.S. PATENT DOCUMENTS

| | | | | |
|---|---|---|---|---|
| 5,280,650 A | * | 1/1994 | Sobti ....................... | 455/343.2 |
| 5,566,366 A | * | 10/1996 | Russo et al. .............. | 455/343.5 |
| 5,592,173 A | * | 1/1997 | Lau et al. ............... | 342/357.12 |
| 5,950,120 A | * | 9/1999 | Gardner et al. .......... | 455/343.1 |
| 6,236,674 B1 | * | 5/2001 | Morelli et al. ............. | 375/219 |
| 6,289,228 B1 | * | 9/2001 | Rotstein et al. ............. | 455/574 |

* cited by examiner

Primary Examiner—Ahmad F. Matar
Assistant Examiner—Marie C. Ubiles
(74) Attorney, Agent, or Firm—Wagner, Murabito & Hao LLP

(57) ABSTRACT

A method and system of periodically measuring the signal strength fluctuations in a wireless connection between a portable computer system and a wireless network. The portable computer system has a main processor and a DSP (digital signal processor). The DSP receives instructions from the main processor for controlling the periodic measuring, and subsequent thereto is placed in low power mode. The main processor is placed into a low power mode after sending the instructions. The DSP periodically awakens to measure the signal strength fluctuations while the main processor remains in a low power mode. When the signal strength fluctuation is unacceptable, this triggers the DSP to awaken the main processor. When the signal strength fluctuation is acceptable, the DSP returns to a low power state until the next periodic measuring.

24 Claims, 7 Drawing Sheets

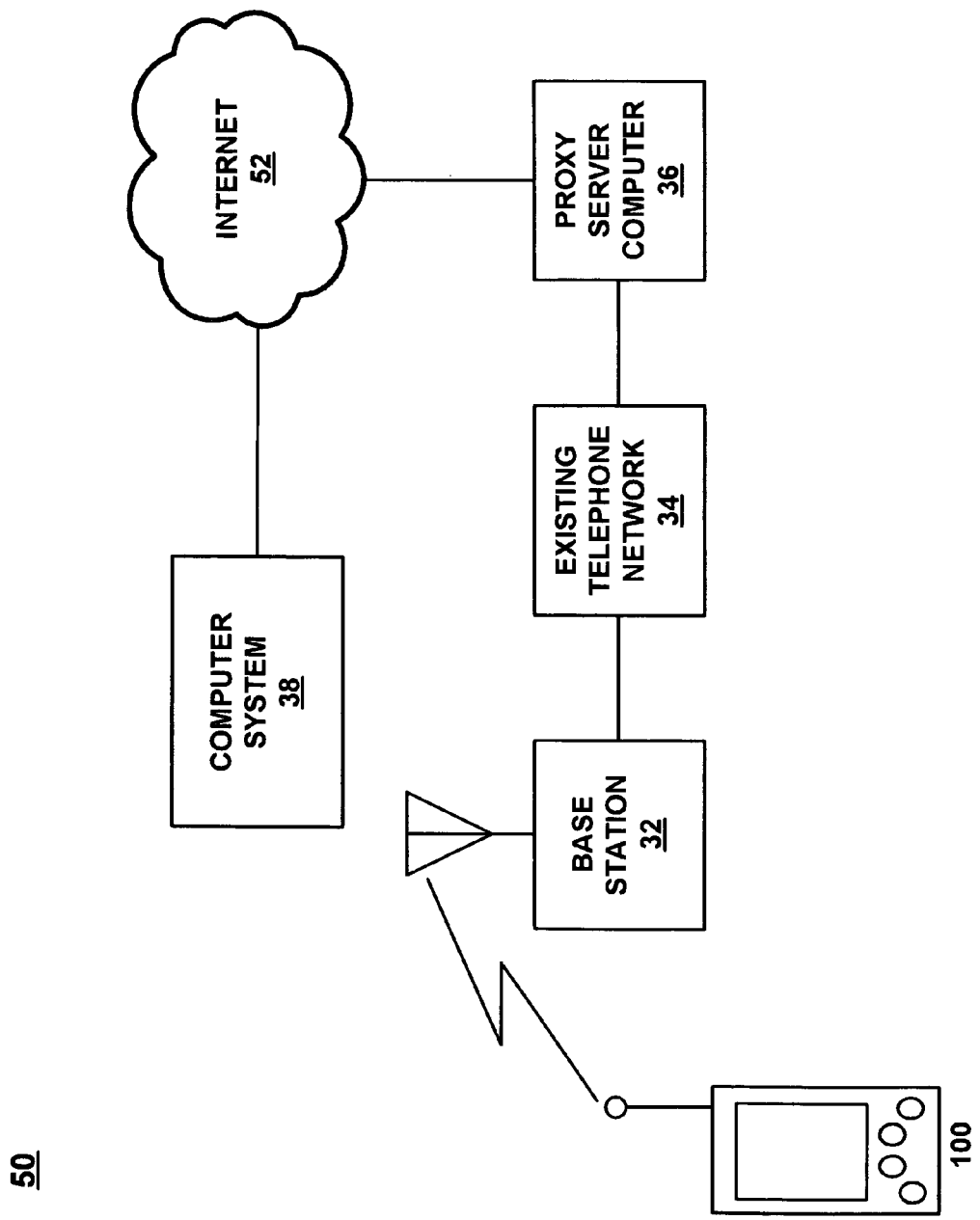

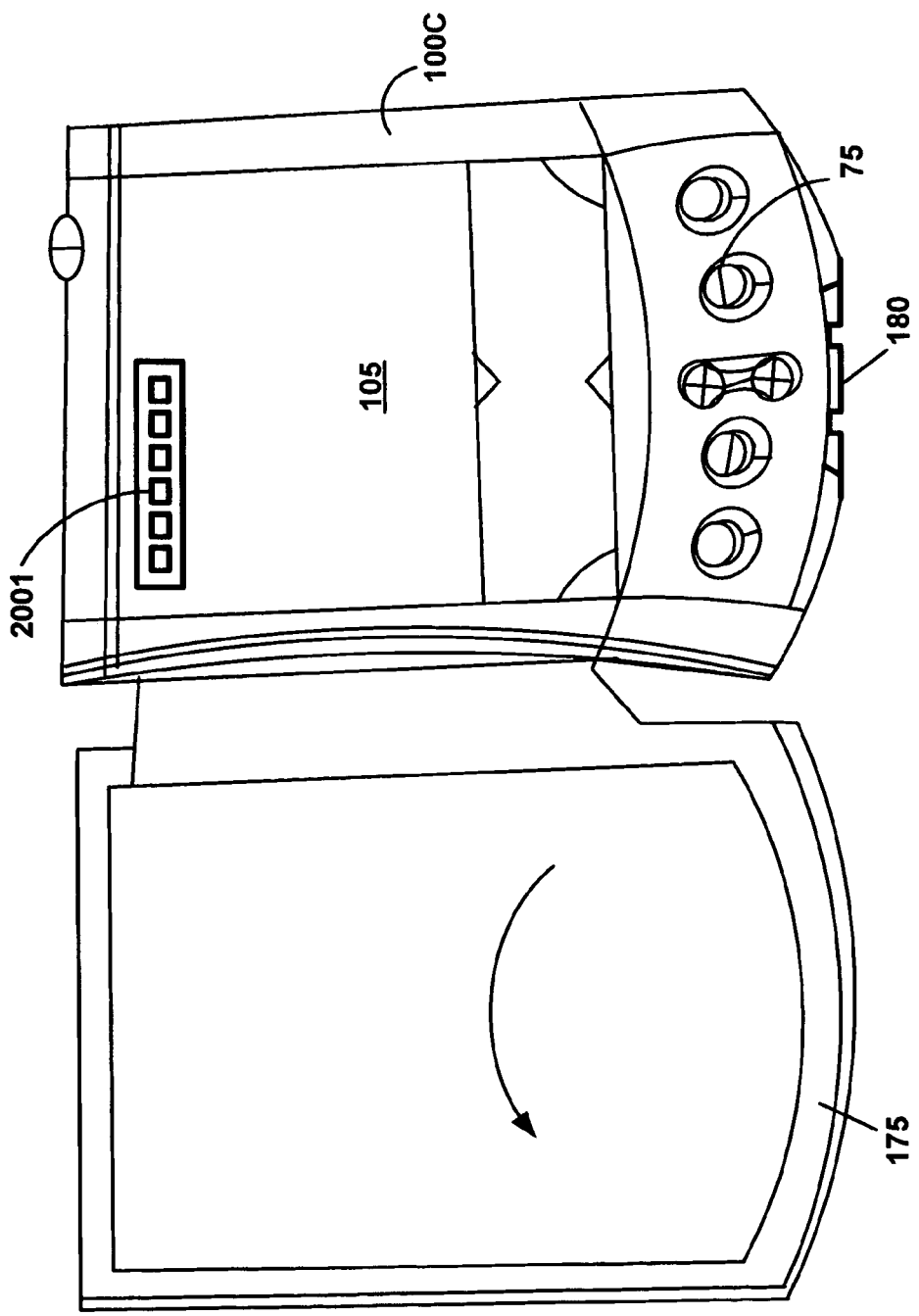

DIGITAL SIGNAL PROCESSOR UPDATE OF SINGLE CHANNEL STRENGTH SIGNAL

CROSS REFERENCE TO RELATED APPLICATION

This is a continuation-in-part of U.S. patent application Ser. No. 09/847,768, entitled "Direct Digital Signal Processor Control of Multi-Channel Scan for Re-Establishing Connections in a Wirelessly Networked Device," by C. Skinner, J. Brown, and W. Wong, filed May 1, 2001, now U.S. Pat. No. 6,901,276, assigned to the assignee of the present invention and hereby incorporated herein by reference.

FIELD OF THE INVENTION

The present invention relates to portable computer systems such as personal digital assistants or palmtop computer systems. More specifically, the present invention relates to portable computer systems that are configured with wireless (radio) communication functionality.

BACKGROUND OF THE INVENTION

As the continuing advances in technology have enabled the further miniaturization of the components required to build computer systems, new categories of computer systems have been created. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like.

A palmtop computer system is a computer that is small enough to be held in the user's hand and as such is "palm-sized." As a result, a palmtop is readily carried about in the user's briefcase, purse, and in some instances, in the user's pocket. By virtue of its size, the palmtop computer, being inherently lightweight, is therefore exceptionally portable and convenient.

Continuing miniaturization has provided for the development of additional functionality, which can be incorporated into some portable computer systems. One such additional functionality incorporated into some portable computer systems has been wireless (radio) capability. Some portable computer systems are equipped with radio transceivers (receiver/transmitter) that provide two way communication between a wireless communications network and the portable computer system. Further, in addition to the main processor, the portable computer system may also include a DSP (digital signal processor), adapted for processing of data to be transceived. The DSP performs some of the communication processes that would have been performed by the main processor.

Generally, most portable computer systems are powered by disposable or rechargeable batteries. Because the reduced size of the portable computer system, such that it is deemed "palm-sized," predicates the volume of energy which may be stored within, smaller batteries are being utilized to comply with the diminutive size of the portable computer system. Further, the portable computer system's power consumption is a significant consideration in reducing the rate with which the batteries either need to be replaced or recharged. Accordingly, portable computer systems are enabled to be placed into a minimum or low power mode, such as a sleep mode or a deep sleep mode, while the system is not processing a specific function or particular operation.

Until recently, when communication occurred between the portable computer system and a wireless network, the portable computer system was aware of an expected transmission of data. For example, when data was being wirelessly transceived by the portable computer system, is was in response to a request by the portable computer system. Accordingly, the portable computer system was purposefully placed into a transceiving state when a transmission was anticipated or desired, but otherwise was not in a transceiving mode.

Because of the ever increasing complexity within the portable computer system, the portable computer system is frequently being implemented in applications that require continuous transceiving readiness, much like a cellular telephone. For example, when a cellular telephone is powered up, it is enabled to receive calls at any time. By the same token, a portable computer system is able to receive, or transmit, data or information nearly any time the transceiver is powered up, regardless of whether other components are in a sleep (low power consumption) mode.

It is desirable for the portable computer system (with a wireless transceiver) to remain "in coverage" when the transceiver is powered up, such that uninterrupted wireless communication is enabled. However, due to, in part, its portability, there may be instances when the signal strength may fluctuate such that the communicative link between the portable computer system and the wireless network is lost. Additionally, dependent upon the amount of signal strength fluctuation, the portable computer system may entirely lose the communication link, so as to be considered "out of coverage." For example, the portable computer system has, while in one location, an established connection utilizing a particular broadcast channel of a network. Subsequent to or during relocation, the signal strength of that channel may fluctuate such that the communication signal may be lost.

Currently, during signal strength monitoring, the radio components are powered up for checking and then powered down afterward, or the radio components are powered up continuously, which has an adverse affect on the power supply of the portable computer system. Additionally, the main processor is commonly activated during this monitoring, which is also a substantial drain on the portable computer system's power supply.

SUMMARY OF THE INVENTION

Thus, a need exists for a method and system for providing periodic monitoring of the strength of a communication signal being transceived without undue depletion of the retained power supply within a portable computer system. An additional need exists for a method and system that fills the above listed need and which further provides for an allowable range of signal strength fluctuation before causing the main processor to acquire a new communication channel over which data may be received. The present invention provides a novel solution to these and other needs. These and other objects and advantages of the present invention will no doubt become obvious to those of ordinary skill in the art after having read the following detailed description of the preferred embodiment, which are illustrated in the various figures.

The present invention pertains to a method and system for providing periodic signal strength monitoring without unduly depleting the power supply within a portable computer system. In one embodiment, the wireless network is a Mobitex wireless communication system, but could use any well known wireless communication medium. The present invention can be implemented when the portable computer system is communicating with a wireless network and the strength of the transceiving signal is fluctuating, such that the fluctuation may have a detrimental effect on the communication link.

The present invention can also be implemented during those periods when the portable computer system is out of coverage, monitoring the signal strength and consistency of other broadcast network channels considered for acquiring a new signal.

In one embodiment of the present invention, the portable computer system has a main processor and a DSP (digital signal processor). The main processor sends a command to the DSP which includes the channel to scan, two fluctuation threshold levels, and a sleep time. The main processor is put into a low power (sleep) mode, thereby conserving retained power. The DSP is also placed into a low power (sleep) mode, also conserving retained power. In accordance with the current embodiment, the internal timer of the DSP periodically (as specified by the sleep time) awakens the DSP to monitor the RSSI (radio signal strength indication) for fluctuation during communication. If the DSP detects fluctuation that exceeds the threshold levels, the DSP will interrupt or awaken the main processor to act upon this data. If no threshold crossing fluctuations are detected, the DSP will return to the low power mode until the next specified time for monitoring the RSSI.

The present invention provides a method and system for periodic signal strength monitoring without unduly depleting the power supply within a portable computer system. The present invention further provides, in one embodiment, a method and system that achieves the above listed accomplishment and which provides for an allowable range of signal strength fluctuation without unnecessarily activating the main processor. The present invention further provides a method and system that achieves the above listed accomplishments and which does so while in a low-power (sleep) mode, thereby inherently saving battery power.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of an exemplary network environment including a portable computer system in accordance with one embodiment of the present invention.

FIG. 3A is a top side perspective view of a portable computer system having a hinged front cover in accordance with one embodiment of the present invention.

DETAILED DESCRIPTION

Figure 2A:
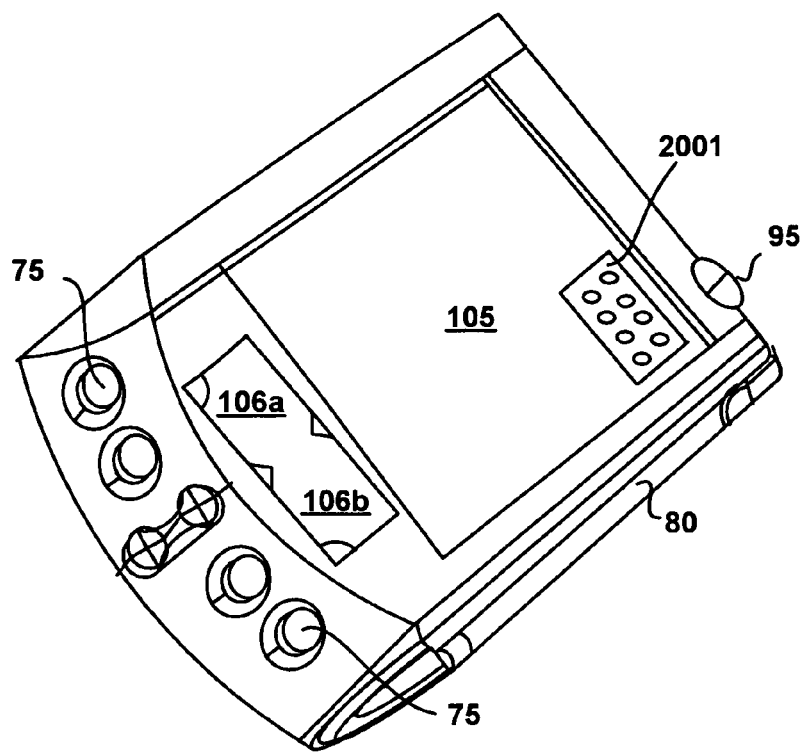
FIG. 2A is a top side perspective view of a portable computer system in accordance with one embodiment of the present invention.

A method and system for periodically measuring channel signal strength during an established wireless communication link between a portable computer system and a wireless network are described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "scanning" or "waking" or "initiating" or "sending" or "receiving" or "transceiving" or "triggering" or "displaying" or "updating" or "measuring" and the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant. However, it is appreciated that the present invention can be used with other types of devices that have the capability to access some type of central device or central site, including but not limited to palmtop computer systems.

Exemplary Network Environment

FIG. 1 is a block diagram of an exemplary network environment 50 including a portable computer system 100 in accordance with one embodiment of the present invention. Portable computer system 100 is also known as a palmtop or palm-sized computer system, a hand-held device, a personal digital assistant (PDA), or a personal information device (PID). In one embodiment, portable computer system 100 has the ability to transmit and receive data and information over a wireless communication interface (e.g., a radio interface).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34.

Furthermore, proxy server computer system 36 is coupled to the Internet 52, thereby enabling portable computer system 100 to communicate with the Internet 52. Coupled with Internet 52 are multiple computer systems (e.g., servers) exemplified by computer system 38. When communicating with a Web site over Internet 52, protocols such as CTP (Compact Transport Protocol) and WAP (wireless access protocol) and markup languages such as CML (Compact Markup Language) and WML (wireless markup language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 either directly to the Internet 52 or directly to computer system 38. It is also appreciated that portable computer system 100 may be coupled to computer system networks other than the Internet 52, such as an Intranet, local area network, or the like.

The data and information that are communicated between base station 32 and portable computer system 100 are the same type of information and data that can conventionally be transferred and received over a wireless communication interface. It should be appreciated that one embodiment of a wireless communication system in accordance with the present invention is the Mobitex wireless communication system.

Exemplary Palmtop Platform

FIG. 2A is a perspective illustration of the top face 100a of one embodiment of portable computer system 100. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Still referring to FIG. 2A, RSSI (radio signal strength indicator) 2001 is shown as disposed upon the upper right corner of display screen 105, in one embodiment of the present invention. In another embodiment, RSSI 2001 may be disposed nearly anywhere upon portable computer system 100, and not necessarily disposed within display screen 105. In this example, RSSI 2001 is a visual indicator using discreet lights, for example, to indicate signal strength. In this example, the stronger the signal, the greater the number of lights that will be illuminated. In another embodiment, a single light may be implemented to indicate RSSI fluctuations, such that when the signal strength is acceptable, the light is illuminated. In yet another embodiment, there may be two differently colored lights, for example, a red and a green light, such that the green light would be illuminated to indicate acceptable signal strength fluctuation. Accordingly, a red light would be illuminated to indicate an unacceptable signal strength fluctuation. In another example, the lights may be nearly any other shape and or size.

It should further be appreciated that in another embodiment, RSSI 2001 may be an audible indicator, where, in one example, a sequence of beeps may indicate signal strength and in another example, the louder a tone, a greater signal strength is indicated and the quieter the tone, a weaker signal strength is indicated. In yet another embodiment, RSSI 2001 may be a motion activating device, such that the signal strength is indicated by the intensity of a vibration, such that an intense motion indicates a strong signal strength.

Figure 2B:
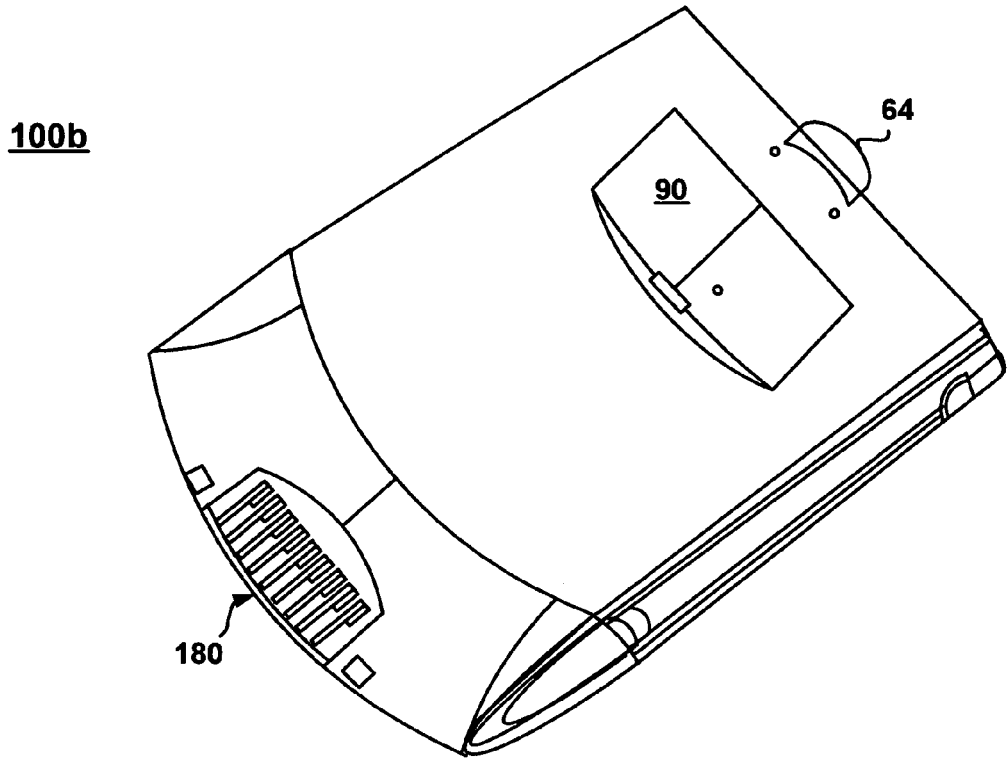
FIG. 2B is a bottom side perspective view of the portable computer system of FIG. 2A.

FIG. 2B illustrates the bottom side 100b of one embodiment of the palmtop computer system that can be used in accordance with various embodiments of the present invention. Battery storage compartment door 90 is shown. In one embodiment, an internal antenna (not shown) may be present and coupled with communication circuit 135 of FIG. 4. A communication interface 180 and an infrared port 64 are also shown. In one embodiment, communication interface 180 is a serial port. In another embodiment, communication interface 180 can be a parallel port, a USB (universal serial bus), an IEEE 1394 connection, and the like. In one embodiment, infrared communication mechanism 64 is compliant with the IrDA (Infrared Data Association) standard and protocol.

FIG. 3A is a perspective illustration of the top face 100c of one embodiment of portable computer system 100. The top face 100a contains a display screen 105 surrounded by a bezel or cover. A removable stylus 80 (as shown in FIG. 2A) is present, although not shown because of the viewing angle. The display screen 105 is a touch screen able to register contact between the screen and the tip of the stylus 80. The stylus 80 can be of any material to make contact with the screen 105. The top face 100c also contains one or more dedicated and/or programmable buttons 75 for selecting information and causing the computer system to implement functions.

Still referring to FIG. 3A, front cover 175 for providing protection against damage to display screen 105 is also shown. Front cover 175 is adapted to rotate about an axis, or hinge, as indicated by the arrow. Also shown is RSSI 2001 disposed upon the upper left corner of display screen 105. In this embodiment, a series of rectangular indicating LEDs (light emitting diodes) are used to visually indicate signal strength. In this example, the weaker the signal, less lights are illuminated and the stronger the signal, more lights are illuminated.

Figure 3B:
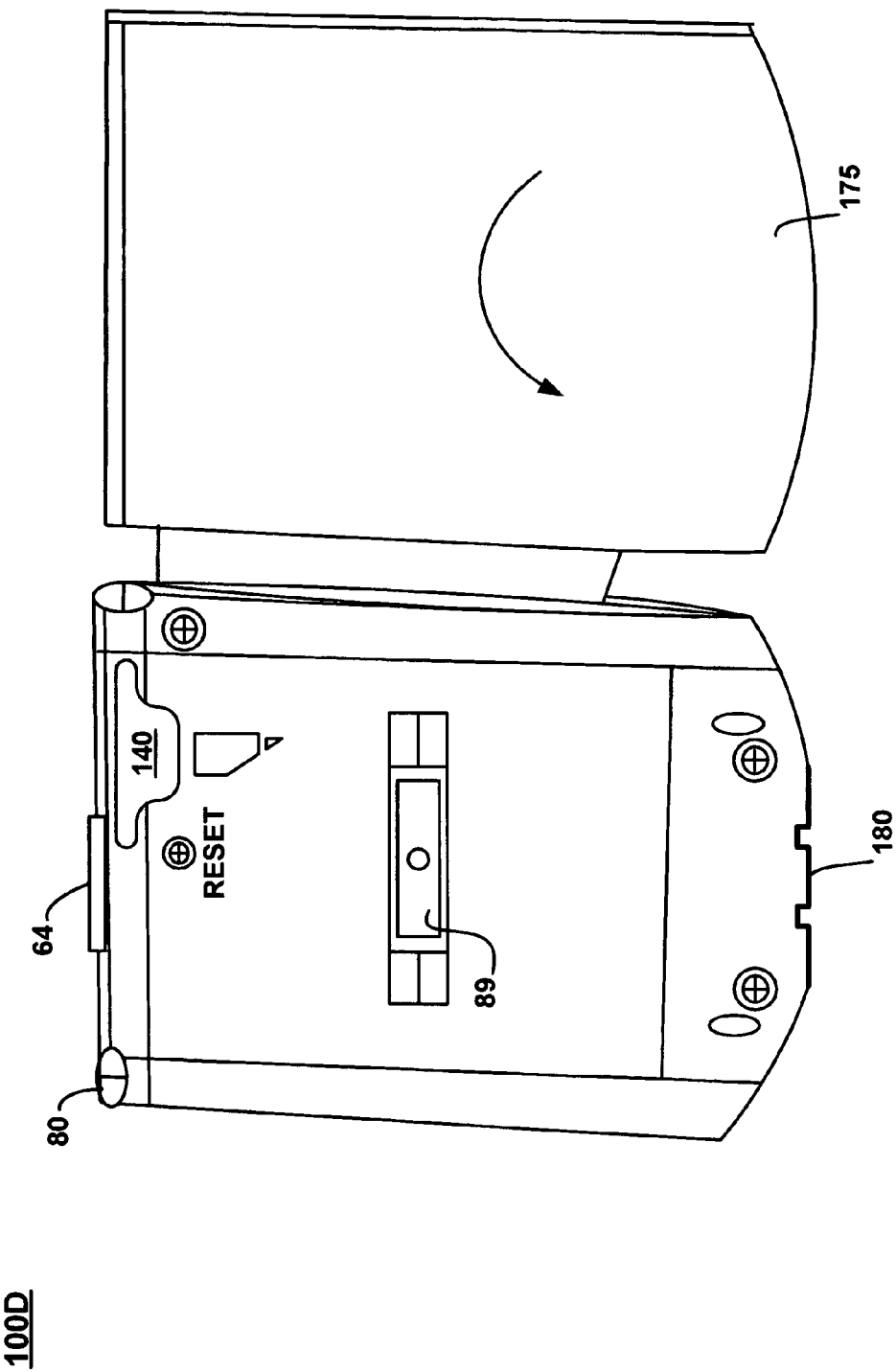
FIG. 3B is a bottom side perspective view of the portable computer system of FIG. 3A.

FIG. 3B illustrates the bottom side 100d of one embodiment of the palmtop computer system that can be used in accordance with various embodiments of the present invention. A stylus 80, an extendible antenna 85, and a battery storage compartment door 89 are shown. A communication interface 180 and an infrared port 64 are also shown. In one embodiment, communication interface 180 is a serial port. In another embodiment, communication interface 180 can be a parallel port, a USB (universal serial bus), an IEEE 1394 connection, and the like. In one embodiment, infrared communication mechanism 64 is compliant with the IrDA (Infrared Data Association) standard and protocol.

Still referring to FIG. 3B, external auxiliary card slot 140 is shown. Card slot 140 is adapted to receive compact and/or flash memory cards, e.g., SDs (secure digital cards), or MMCs (multimedia cards), or memory sticks and the like. Front cover 175 is also shown and is adapted to rotate about the axis, or hinge, as indicated by the arrow.

Figure 4:
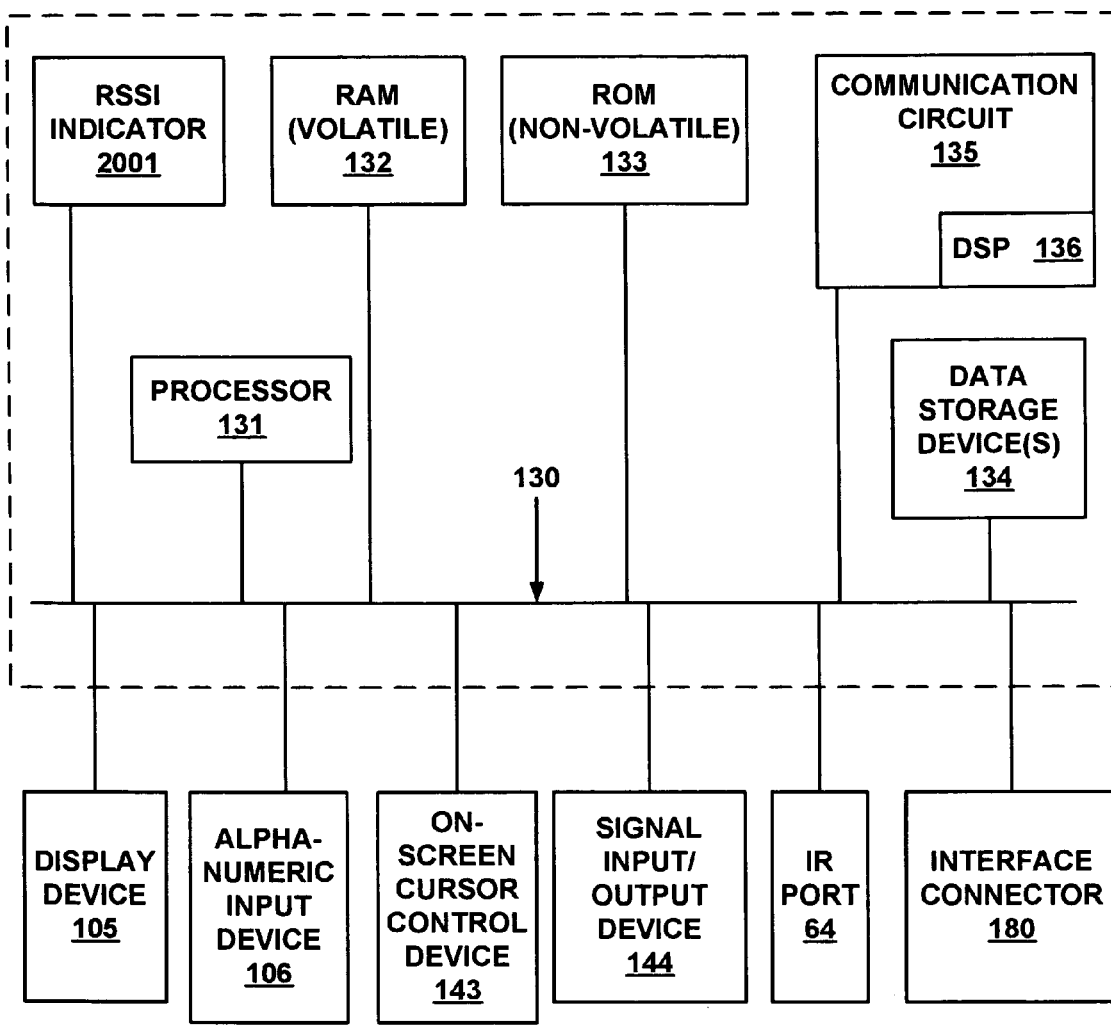
FIG. 4 is a block diagram of an exemplary portable computer system upon which embodiments of the present invention may be practiced.

FIG. 4 is a block diagram of one embodiment of a portable computer system 100 upon which embodiments of the present invention may be implemented. Portable computer system 100 is also often referred to as a PDA, a PID, a palmtop, or a hand-held computer system.

Portable computer system 100 includes an address/data bus 130 for communicating information, a central (main) processor 131 coupled with the bus 130 for processing information and instructions, a volatile memory 132 (e.g., random access memory, RAM) coupled with the bus 130 for storing information and instructions for the main processor 131, and a non-volatile memory 133 (e.g., read only memory, ROM) coupled with the bus 130 for storing static information and instructions for the main processor 131. Portable computer system 100 also includes an optional data storage device 134 (e.g., auxiliary card slot 140 of FIG. 3B) coupled with the bus 130 for storing information and instructions. Device 134 can be removable. Portable computer system 100 also contains a display device 105 coupled to the bus 130 for displaying information to the computer user.

In the present embodiment, portable computer system 100 includes a signal input/output device (transceiver) 144 providing it with the capability for wireless communication. The transceiver 144 provides a wireless radio frequency (RF) communication link between computer system 100 and other devices, using any of the various RF protocols and standards. In one embodiment, the Mobitex wireless communication specification is used. In another embodiment, the Bluetooth wireless communication specification is used. In still another embodiment, a wireless LAN (local area network) communication specification is used. It is appreciated that transceiver 144 may be integrated into portable computer system 100, or that transceiver 144 may be a separate component coupled to portable computer system using, for example, serial port 180.

It is appreciated that in another embodiment portable computer system 100 may also include a telephony chipset or the like providing it with the functionality of a cellular phone, in particular the capability to transmit and receive cellular communications. In one embodiment, the telephony chipset is compatible with the standards for GSM and GPRS (Global System for Mobile Communications and General Packet Radio Service, respectively). It is appreciated that other telephony protocols and standards may also be used with the present invention.

In the present embodiment, portable computer system 100 of FIG. 4 includes communication circuitry 135 coupled to bus 130. In one embodiment, communication circuitry 135 is a universal asynchronous receiver-transmitter (UART) module that provides the receiving and transmitting circuits required for serial communication for both the serial port 180 and the infrared port 64. Communication circuitry 135 also includes DSP (digital signal processor) 136 for processing data to be transmitted or data that are received via transceiver 144.

Also included in computer system 100 is an optional alphanumeric input device 106 that, in one implementation, is a handwriting recognition pad ("digitizer"). Alphanumeric input device 106 can communicate information and command selections to main processor 131 via bus 130. In one implementation, alphanumeric input device 106 is a touch screen device. Alphanumeric input device 143 is capable of registering a position where a stylus element (not shown) makes contact.

Portable computer system 100 also includes an optional cursor control or directing device (on-screen cursor control 143) coupled to bus 130 for communicating user input information and command selections to main processor 131. In one implementation, on-screen cursor control device 143 is a touch screen device incorporated with display device 105. On-screen cursor control device 143 is capable of registering a position on display device 105 where a stylus element makes contact. The display device 105 utilized with portable computer system 100 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 105 is a flat panel display.

Portable computer system 100 also includes RSSI (radio signal strength indicator) 2001 which is coupled to communication bus 130 and is shown in FIGS. 2A and 3A. RSSI 2001 is adapted to provide a visual indication of a particular broadcast network's channel signal strength during periods of transceiving.

DSP Monitoring of Fluctuation in Channel Signal Strength

The purpose of the signal strength fluctuation measurement is to provide to a user a quicker more rapid update of the current channel signal strength. It should be appreciated that the present invention is applicable when in coverage and when out of coverage. The somewhat limited power resources contained within portable computer system 100 (FIG. 4) are conserved by utilizing a DSP (digital signal processor) to perform the signal strength fluctuation measurements instead of having main processor 131 (FIG. 4) perform that task. Additionally, the transceiving notification (signal strength) is updatable at a more frequent rate than what the stack (running on main processor 131 of FIG. 4) was able to provide without severe negative impacting of the retained power supply.

Figure 5:
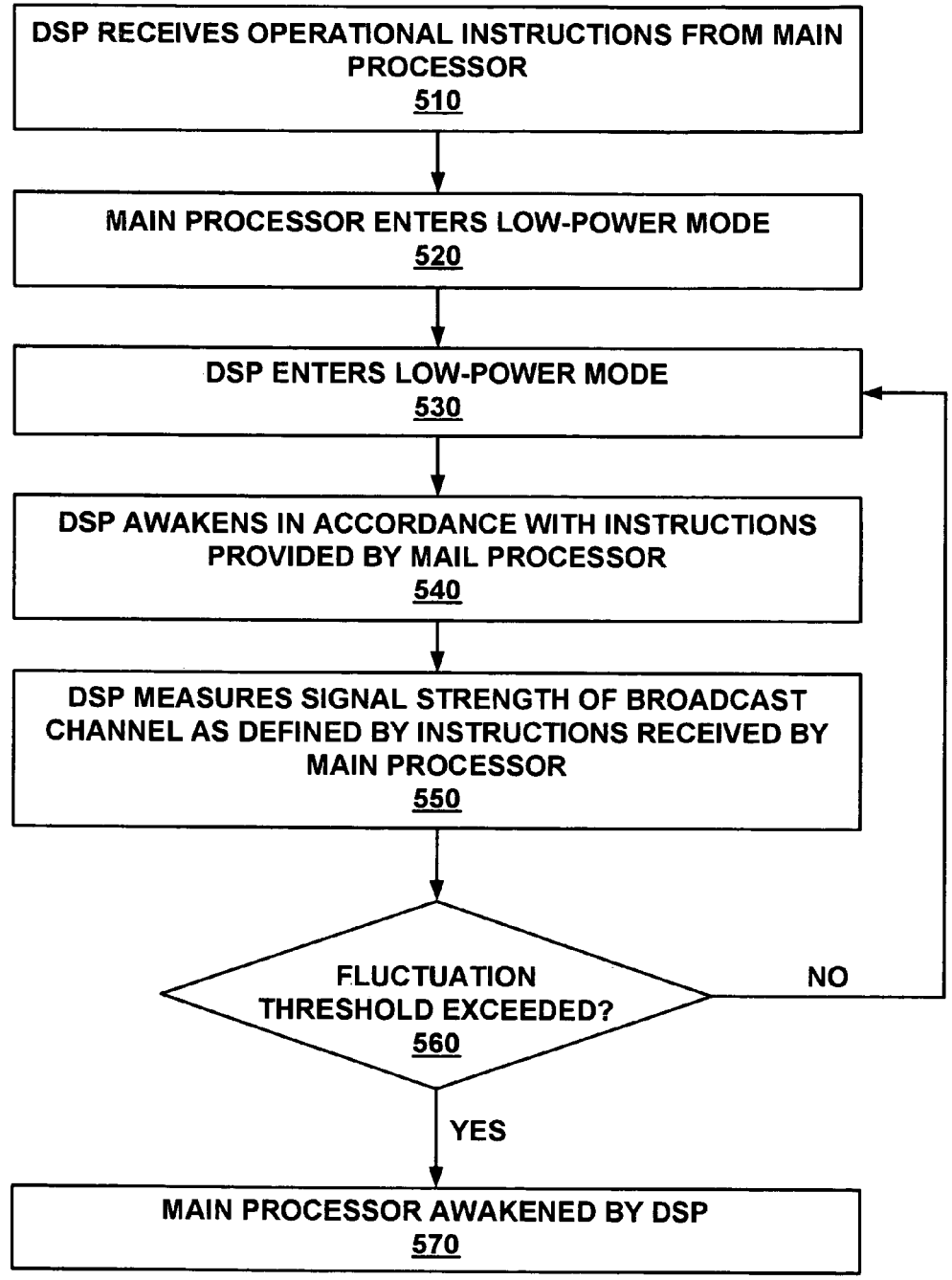
FIG. 5 is a flowchart showing steps in a process for periodic measuring of channel signal strength during an established wireless communication link between a portable computer system and a wireless network in accordance with one embodiment of the present invention.

FIG. 5 is a flowchart of the steps in a process 500 for periodic measuring of signal strength fluctuation of a wireless connection between portable computer system 100 (FIG. 4) and wireless network 50 (FIG. 1) in accordance with one embodiment of the present invention. In the present embodiment, process 500 is implemented as computerreadable program instructions executed by portable computer system 100. For the significant conservation of power, portions of process 500 are performed by DSP 136 of FIG. 4 while main processor 131 (FIG. 4) remains in a low power mode, as will be seen.

In step 510 of FIG. 5 and with reference to FIG. 4, DSP 136 receives from main processor 131 instructions for controlling the periodic measuring of signal strength fluctuation of a wireless connection to be performed by DSP 136. The instructions provide the duration of a periodic timed interval of low power entered into by DSP 136, in one embodiment of the present invention. The instructions further provide a particular broadcast channel frequency for DSP 136 to measure. The frequency to be measured for fluctuation by DSP 136 equates to the frequency of the wireless connection. The instructions also provide an upper threshold and a lower threshold which define the range of acceptable fluctuation of the signal strength of the wireless connection.

Still referring to step 510, the duration of a periodic timed interval provides a regulated sleep time for DSP 136. When the sleep time is over, the DSP is awakened to perform the measuring of the signal strength fluctuation.

In step 520 of FIG. 5, with reference also to FIG. 4, once main processor 131 has sent the controlling instructions regarding periodic measuring to DSP 136, main processor 131 is automatically placed into a low power mode (e.g., a sleep mode or a deep sleep mode). In accordance with the present invention, main processor 131 will remain in a low power mode through step 570 of process 500.

In step 530 of FIG. 5 and with reference also to FIG. 4, once DSP 136 has received the controlling instruction regarding periodic measuring of signal strength fluctuation, DSP 136 is automatically placed into a low power mode (e.g., a sleep mode or a deep sleep mode).

In step 540 of FIG. 5, still with reference to FIG. 4, subsequent to the expiration of the periodic timed interval of low power mode in which DSP 136 was placed, DSP 136 is awakened to measure signal strength fluctuation of a wireless connection. In one embodiment, the duration of the periodic timed interval can be twenty seconds. In another embodiment, the duration may be fifteen seconds. In yet another embodiment, the duration may be for thirty seconds. It should be appreciated that the duration of periodic timed interval of low power mode is adjustable, such that a wireless connection prone to large and frequent fluctuation may required more frequent measurement, and a wireless connection having relatively constant signal strength may require less frequent measuring of signal strength.

In step 550 of FIG. 5, once awakened, DSP 136 measures signal strength fluctuation of the wireless connection, in one embodiment. It should be appreciated that DSP 136 performs the measuring of the signal strength fluctuation while main processor 131 remains in a low power mode.

In step 560 of FIG. 5, subsequent to the measuring of fluctuation of signal strength, provided the measured signal strength fluctuation is within the range of acceptable fluctuation, as defined in step 510, DSP 136 returns to a low power mode until the period timed interval of low power mode expires and DSP 136 is again awakened to perform signal strength fluctuation of the wireless connection. However, when an instance occurs when the measured signal strength fluctuation exceeds the range of acceptable fluctuation, DSP 136 is automatically triggered to awaken main processor 131.

In step 570, once main processor 131 has been awakened, caused by the fluctuation of signal strength exceeding the range of acceptable fluctuation, main processor 131 acts upon this data. In one embodiment, main processor 131 may switch to an alternate broadcast channel which is known to have minimal signal strength fluctuation. In another embodiment, main processor may be instructed to search for an acceptable broadcast channel with which it may continue the wireless connection previously obtained.

Figure 6:
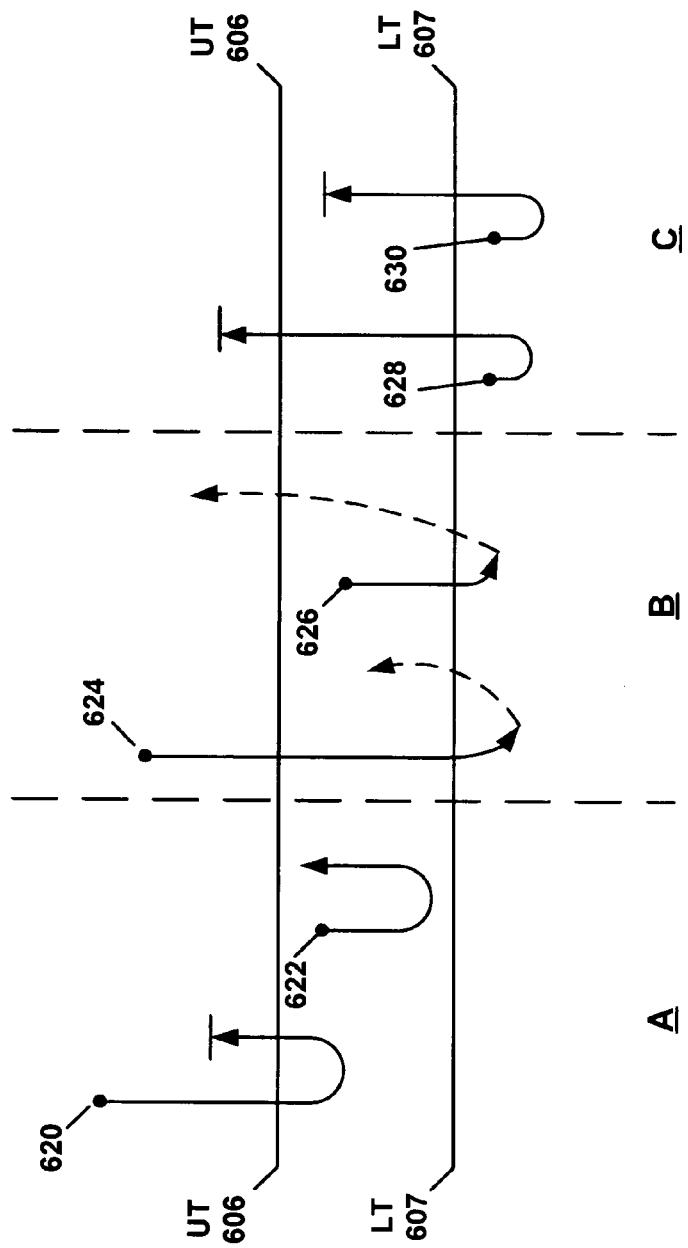
FIG. 6 is a linear representation of threshold limits utilized by the present invention when implemented for RSSI monitoring, in accordance with one embodiment of the present invention.

FIG. 6 is a linear representation of the upper and lower threshold values utilized during implementation of the of the present invention, in accordance with one embodiment of the present invention. The upper and lower thresholds provide a range of fluctuation so that main processor 131 (FIG. 4) is not unnecessarily awakened. Because the signal strength is affected by noise in the system, the RSSI (radio signal strength indicator) value calculated by the DSP 136 will have some variance. If utilizing a single threshold level, when the signal strength is close to the threshold, the RSSI read by DSP 136 could fluctuate around the threshold level and cause the DSP 136 to unnecessarily awaken main processor 131. To avoid this problem, main processor 131 sends two threshold levels to the DSP 136. This allows for a range of threshold levels so as not to trigger the DSP to awaken main processor 131.

Still referring to FIG. 6, upper threshold level UT 606 and lower threshold level LT 607 which define a range of acceptable fluctuations are shown. FIG. 6 has three sections which are sections A, B, and C. Section A is to the left, section B is in the middle, and section C is to the right. Each section has two examples of signal strength fluctuations.

For example, assume that an RSSI of 6 dB (decibels) is measured. The main processor may, in this example, want to be informed when the signal strength drops below an RSSI level of 5.0. Accordingly, the main processor could send to the DSP thresholds that correspond to 4.5 and 5.0, which is shown in UT 606 and LT 607, respectively. The DSP would not awaken the main processor until the RSSI went below 4.5 dB, represented by LT 607. Conversely, if the initial RSSI were 3 dB, the DSP would not awaken the main processor until the RSSI rose above 5 dB, represented by UT 606. RSSI values between 4.5 and 5 dB would not trigger the DSP to awaken the main processor.

Referring to section A of FIG. 6, in one example, fluctuation 620 is shown to have an initial RSSI level which is above UT 606. During transceiving, 620 falls below UT 606 (5 dB) but remains above LT 607. Accordingly, fluctuation 620 does not trigger the DSP to awaken the main processor.

In another example, fluctuation 622 is shown to have an initial RSSI level which is below UT 606 but above LT 607. During transceiving, 622 drops lower but does not fall below LT 607. Accordingly, fluctuation 622 does not trigger the DSP to awaken the main processor.

Referring to section B of FIG. 6, in one example, fluctuation 624 is shown to have an initial RSSI of 6 dB. During transceiving, 624 drops below UT 606 and also drops below LT 607. Accordingly, fluctuation 624 does trigger the DSP to awaken the main processor.

In another example, fluctuation 626 is shown to have an initial RSSI level which is between UT 606 and LT 607. During transceiving, 626 falls below LT 607. Accordingly, fluctuation 626 triggers the DSP to awaken the main processor.

Referring to section C of FIG. 6, fluctuation 628 is shown to have an initial RSSI level of 3 dB which is below LT 607. During transceiving 628 rises above LT 607 and continues above UT 606. Accordingly, fluctuation 628 would cause the DSP to awaken the main processor.

In another example, fluctuation 630 is shown to have an initial RSSI level which is below LT 607. During transceiving 630 rises above LT 607 but remains below UT 606. Accordingly, fluctuation 630 would not cause a triggering of the DSP to awaken the main processor.

In summary, the present invention provides a method and system which conserves retained power within a portable computer system while periodically measuring signal strength fluctuations in a wireless connection between a portable computer system and a wireless network. In accordance with the present invention, the DSP awakens periodically from a low power mode to measure signal strength fluctuation while the main processor remains in a low power mode. If the measured signal strength fluctuation is within an acceptable range, the DSP returns to a low power mode until the next periodic measurement. Not until an unacceptable range of fluctuation is measured, is the main processor awakened. With the main processor remaining in a low power mode during signal strength measurements, battery life is extended thereby reducing the frequency with which the batteries need to be recharged or replaced.

The present invention has been described in the context of a portable computer system; however, the present invention may also be implemented in other devices having, for example, a main processor and a DSP (digital signal processor) that enables the main processor to be placed into a low power mode while the DSP performs certain functions on behalf of the main processor, including those not necessarily associated with measuring signal strength fluctuations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer system comprising a DSP (digital signal processor) and a main processor, a method for periodically measuring signal strength fluctuations of a wireless connection between said computer system and a wireless network, said method comprising the steps of:
   a) receiving instructions by said DSP from said main processor controlling said measuring of said signal strength fluctuations;
   b) waking said DSP during periods of transceiving, said waking caused by expiration of a periodic timed interval of low power mode entered by said DSP;
   c) measuring said signal strength of said wireless connection fluctuations during periods of transceiving, wherein said step c) is performed by said DSP while said main processor remains in said low power mode;
   d) waking said main processor provided said fluctuation is in excess of an acceptable range; and
   e) returning said DSP to said low power mode provided said fluctuation of said signal strength is within said acceptable range.

2. The method as recited in claim 1 further comprising the steps of:
   automatically placing said main processor in a low power mode subsequent to said step a); and
   automatically placing said DSP subsequent to said step a).

3. The method as recited in claim 1 wherein said instructions are for providing the duration of said periodic timed interval of said low power mode entered by said DSP.

4. The method as recited in claim 1 wherein said instructions provide an upper threshold limit and a lower threshold limit of said wireless connection signal strength fluctuation, wherein said upper and said lower threshold limits are for defining said acceptable range.

5. The method as recited in claim 1 wherein said instructions provide a particular broadcast channel frequency for said DSP to monitor, said frequency equating to the frequency of said wireless connection.

6. The method as recited in claim 1 wherein said step b) further comprises the step of:
   b1) repeating steps b) and c) automatically in accordance with said periodic timed intervals of said instructions.

7. The method as recited in claim 1 further comprising the step of:
   f) displaying said measurement of said fluctuation of said signal strength on a signal strength indicator, wherein said display is generated by said DSP.

8. The method as recited in claim 1 wherein said wireless network is a Mobitex wireless communication system.

9. A portable computer system comprising:
   a bus;
   a signal strength indicator coupled to said bus;
   a wireless transceiver coupled to said bus;
   a main processor coupled to said bus; and
   a DSP (digital signal processor) coupled to said bus for executing a method for periodically measuring the signal strength of a wireless connection between said portable computer system and a wireless network, said method comprising the steps of:
   a) receiving instructions by said DSP from said main processor for controlling said measuring said signal strength for fluctuations;
   b) waking said DSP during periods of transceiving, wherein said waking is caused by the expiration of a defined periodic interval of low power mode entered by said DSP;
   c) measuring said signal strength for said fluctuations during periods of transceiving, wherein said step c) is performed by said DSP while said main processor remains in said low power mode;
   d) waking said main processor, provided said fluctuations are in excess of an acceptable range; and
   e) returning said DSP to said low power mode provided said fluctuations are within said acceptable.

10. The system as recited in claim 9 and further comprising the steps of:
    automatically placing said main processor into a low power mode subsequent to said step a); and
    automatically placing said DSP into a low power mode subsequent to said step a).

11. The system as recited in claim 9 wherein said instructions provide a duration of said periodic time interval of low power mode entered by said DSP.

12. The system as recited in claim 9 wherein said instructions are for providing an upper threshold limit and a lower threshold limit of said wireless connection signal strength fluctuations, wherein said upper and said lower threshold levels are for defining an acceptable range.

13. The system as recited in claim 9 wherein said instructions provide a particular broadcast channel frequency for said DSP to measure, said frequency equating to the frequency of said wireless connection.

14. The system as recited in claim 9 wherein said step b) further comprises the step of:

b1) repeating said steps b) and c) automatically in accordance with said periodic timed intervals.

15. The system as recited in claim 9 and further comprising the step of:

f) displaying said measurement of said fluctuation of said signal strength on said signal strength indicator, wherein said display is generated by said DSP.

16. The system as recited in claim 9 wherein said wireless network is a Mobitex wireless communication system.

17. In a portable computer system comprising a DSP (digital signal processor) and a main processor and an RSSI (radio signal strength indicator), a method for periodically measuring of fluctuation of the signal strength of a wireless connection between said portable computer system and a wireless network, said method comprising the steps of:

a) receiving instructions by said DSP from said main processor for controlling periodic measuring of said signal strength for fluctuations;
  b) said DSP waking to perform said periodic measurement of said fluctuations of said signal strength;
  c) said DSP measuring said fluctuations of said signal strength while said main processor remains in a low power mode;
  d) said DSP waking said main processor provided said fluctuations exceeds an acceptable range; and
  e) said DSP returning to said low power mode provided said fluctuations of said signal strength are within said acceptable range.

18. The system as recited in claim 17 and further comprising the steps of:

automatically placing said main processor into a low power mode subsequent to said step a); and
  automatically placing said DSP into a low power mode subsequent to said step a).

19. The system as recited in claim 17 wherein said instructions provide a duration of said periodic time intervals of said low power mode entered by said DSP.

20. The system as recited in claim 17 wherein said instructions provide an upper threshold limit and a lower threshold limit of said fluctuation of said wireless connection signal strength fluctuation, wherein said upper and said lower threshold limits are for defining an acceptable range.

21. The system as recited in claim 17 wherein said instructions provide a particular broadcast channel frequency for said DSP to measure, said frequency equating to the frequency of said wireless connection.

22. The system as recited in claim 17 wherein said step b) further comprises the step of:

b1) said DSP repeating said step b) and said step c) automatically in accordance with said periodic timed intervals.

23. The system as recited in claim 17 and further comprising the step of:

f) said DSP generating a display of said measured fluctuation of said signal strength, wherein said display is on said RSSI.

24. The method as recited in claim 17 wherein said wireless network is a Mobitex wireless communication system.

* * * * *